US012646991B2

(12) United States Patent　(10) Patent No.: US 12,646,991 B2
Kim et al.　(45) Date of Patent: Jun. 2, 2026

(54) SEGMENTED STATOR CORE

(71) Applicant: HYUNDAI MOBIS CO., LTD., Seoul (KR)

(72) Inventors: Yong Ho Kim, Seoul (KR); Jin Woo Choi, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 218 days.

(21) Appl. No.: 18/666,127

(22) Filed: May 16, 2024

(65) Prior Publication Data

US 2025/0079921 A1 Mar. 6, 2025

(30) Foreign Application Priority Data

Sep. 5, 2023 (KR) ........................ 10-2023-0117785

(51) Int. Cl.
*H02K 3/24* (2006.01)
*H02K 1/16* (2006.01)
*H02K 3/34* (2006.01)
*H02K 3/487* (2006.01)

(52) U.S. Cl.
CPC ................. *H02K 3/24* (2013.01); *H02K 1/16* (2013.01); *H02K 3/345* (2013.01); *H02K 3/487* (2013.01)

(58) Field of Classification Search
CPC ............ H02K 1/16; H02K 1/165; H02K 1/20; H02K 3/24; H02K 3/345; H02K 3/487; H02K 9/19; H02K 9/193; H02K 9/197; H02K 9/20; H02K 1/182
See application file for complete search history.

(56) References Cited

U.S. PATENT DOCUMENTS

| | | | |
|---|---|---|---|
| 9,831,746 B2 * | 11/2017 | Maki-Ontto | ............. H02K 9/02 |
| 10,886,805 B2 | 1/2021 | Takahashi et al. | |
| 2014/0265666 A1 * | 9/2014 | Shoykhet | ............... H02K 9/197 310/59 |
| 2018/0054096 A1 * | 2/2018 | Dlala | ..................... B60K 11/02 |
| 2021/0025371 A1 * | 1/2021 | Ma | ........................... H02K 9/00 |

FOREIGN PATENT DOCUMENTS

KR 10-2021-0026357 A 3/2021

OTHER PUBLICATIONS

Extended European Search Report issued on Dec. 2, 2024 in European Patent Application No. 24179471.8.

* cited by examiner

*Primary Examiner* — Naishadh N Desai
(74) *Attorney, Agent, or Firm* — Morgan, Lewis & Bockius LLP

(57) ABSTRACT

The present disclosure relates to a stator core applied to an electric motor, and more particularly, to a stator core design having improved cooling performance. In the segmented stator core of the present disclosure, since the coil inside the slot having a temperature higher than that of the end coil is cooled, the risk of damaging the insulating portion may be reduced, and since both the end coil and the coil inside the slot may be cooled, a load is small even if a high current is applied, and thus, the power may be increased in the same motor size or the motor size based on the same power may be reduced.

12 Claims, 13 Drawing Sheets

FIG. 7

SEGMENTED STATOR CORE

CROSS-REFERENCE TO RELATED APPLICATIONS

This application claims priority under 35 U.S.C. § 119 to Korean Patent Application No. 10-2023-0117785, filed on Sep. 5, 2023, in the Korean Intellectual Property Office, the disclosure of which is incorporated herein by reference in its entirety.

TECHNICAL FIELD

The following disclosure relates to a stator core applied to an electric motor, and more particularly, to a stator core design having improved cooling performance.

BACKGROUND

Conventionally, a reduction in weight and size of driving motors has been aimed for development as a way to improve vehicle mileage. Accordingly, when the size of vehicle motors was reduced to increase the power of vehicle motors per unit volume, copper loss generated by coils increased to obtain the same power, and the increase in the copper loss generated by coils led to an increase in coil temperature, thereby causing a problem of insulation damage.

Thus, in the related art, in order to prevent this phenomenon, there was an attempt to cool heat generated by coils, and an oil cooling method was used. The existing oil cooling method attempted to directly cool an end coil outside a stator core or the stator core by spraying cooling fluid.

Since the existing direct cooling method focuses on cooling only the end coil exposed to the outside of the stator core, there is a problem in that the temperature of coils inside a stator core slot remains high. In addition, since a temperature sensor that monitors the temperature of the coil is also attached to the end coil, even if the temperature of the coil inside the slot increases, a controller cannot reflect the increased temperature, so there is still a risk of coil damage.

SUMMARY

An embodiment of the present disclosure is directed to providing a segmented stator core in which an internal coil of a stator core slot having a temperature increasing to the highest temperature, among oil cooling motor components, is directly cooled, thereby improving cooling performance of the coil.

Another embodiment of the present disclosure is directed to providing a segmented stator core in which power is increased using current density higher than the existing case by improving cooling performance of a slot internal coil to lower the temperature compared to the same loss.

Another embodiment of the present disclosure is directed to providing a segmented stator core in which cooling efficiency is maximized by applying a heterogeneous shape including a cooling flow path in a portion of a stator core to allow cooling oil to flow into a slot from an outer diameter of the stator core and allowing flowing oil to cool even an end coil outside the stator core.

Another embodiment of the present disclosure is directed to providing a segmented stator core in which the number of components is reduced by injecting cooling fluid to the side of a stator core and allowing the cooling fluid to flow into the stator core through a flow path formed inside the stator.

In one general aspect, a segmented stator core around which a coil is wound includes: a first core part including a first core including a first slot, which is a hole into which the coil is inserted; a second core part including a second slot, which is a hole into which the coil is inserted, and including a 2-1 core and a 2-2 core arranged on both sides of the first core part so that one surface of each of the 2-1 core and the 2-2 core is in contact with a respective side of the first core part; and a third core part including a third slot which is a hole into which the coil is inserted, and including a 3-1 core and a 3-2 core arranged on opposite surfaces of the 2-1 core and the 2-2 core, respectively, so that one surfaces of the 3-1 core and the 3-2 core are in contact with the respective opposite surfaces of the 2-1 core and the 2-2 core, in which the second core part includes a cooling flow path extending to receive cooling fluid from an outside and deliver the cooling fluid to an inside of the second slot.

An outer diameter of the first core part may be smaller than an outer diameter of the second core part and an outer diameter of the third core part.

The second core part may include an outer region that does not contact the first core part, and the cooling flow path may extend through the second core part and includes a cooling fluid inlet disposed in the outer region and a cooling fluid delivery portion having one end and another end connected to the cooling fluid inlet and the second slot, respectively.

The cooling fluid delivery portion may include a first delivery portion in communication with one side of the second slot in a circumferential direction.

The cooling fluid delivery portion may further include a second delivery portion in communication with another side of the second slot in the circumferential direction.

The second slot may be larger than the first slot and the third slot by a predetermined length in width and height.

The first slot, the second slot, and the third slot may be configured such that one end thereof is open toward an opening defined in a center of each of the first core part, the second core part, and the third core part, and each of the first core part, the second core part, and the third core part may include a stator shoe protruding to an inner side of the first slot, the second slot, and the third slot in a circumferential direction from the one end of the first slot, the second slot, and the third slot.

The first slot, the second slot, and the third slot may be configured such that a circumferential length of an end portion of each of the first slot, the second slot, and the third slot opposite to the opening is larger than a circumferential length of an end portion adjacent to the opening.

The stator shoe of the second core part may extend in the circumferential direction to completely block the second slot and the opening from each other.

The stator shoe of the second core part may have a groove recessed in a radial direction in a circumferential center of the stator shoe.

The stator shoes may be formed in two or more pieces in the radial direction, extend longer in the circumferential direction toward the opening, and further include a support inserted between the stator shoes.

The segmented stator core may further include: an insulating portion insulating the coil from the first core part, the second core part, and the third core part, wherein the insulating portion includes a first insulating paper surrounding an outer surface of the coil and a second insulating paper having one surface in contact with inner surfaces of the stator shoe and the first slot, the second slot, and the third slot.

Other features and aspects will be apparent from the following detailed description, the drawings, and the claims.

BRIEF DESCRIPTION OF THE DRAWINGS

FIG. 7 is a partial plan view when a first core part and a second core part of the present disclosure overlap each other.

DETAILED DESCRIPTION OF EMBODIMENTS

Hereinafter, preferred embodiments of the present disclosure will be described in detail with reference to the accompanying drawings. Prior to the description, it should be understood that the terms used in the specification and the appended claims should not be construed as limited to general and dictionary meanings, but rather interpreted based on the meanings and concepts corresponding to technical aspects of the present disclosure based on the principle that the inventor is allowed to define terms.

Hereinafter, the basic configuration of the segmented stator core 1000 of the present disclosure will be described with reference to FIG. 1.

Figure 1:
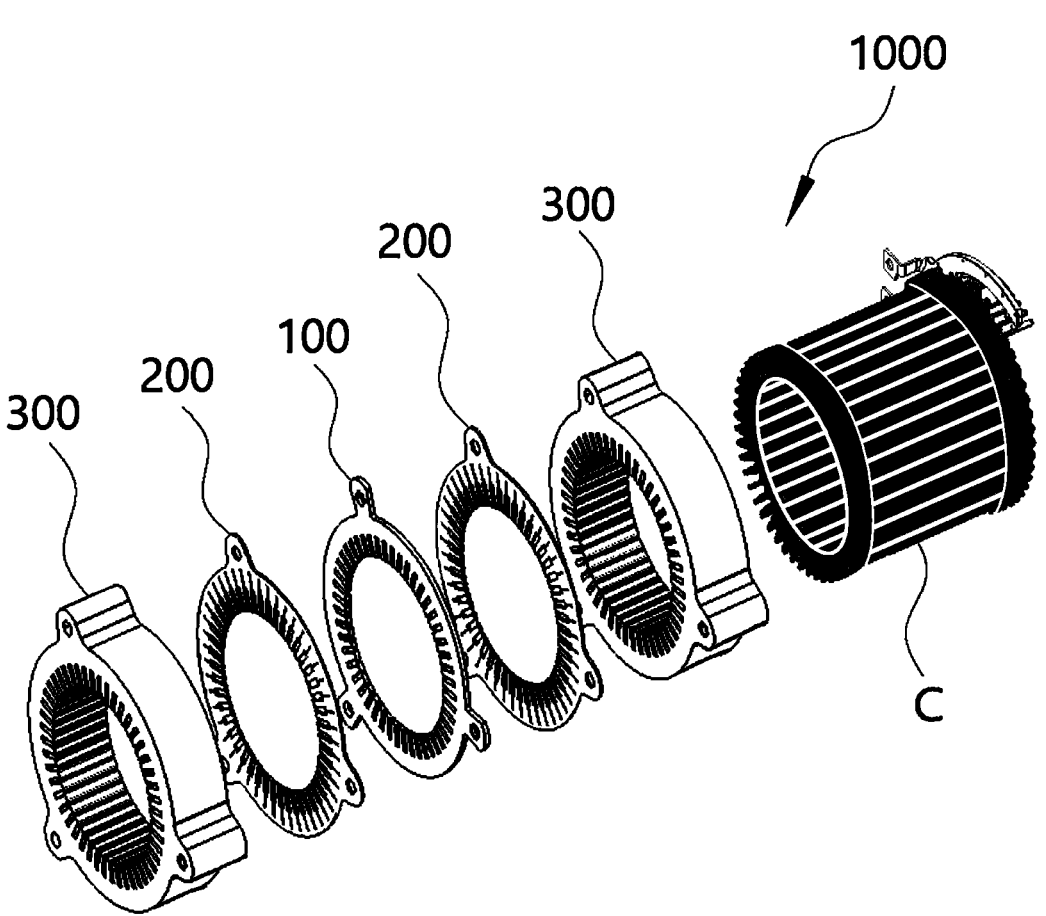
FIG. 1 is an exploded perspective view of a segmented stator core of the present disclosure.

As shown in FIG. 1, a segmented stator core 1000 of the present disclosure, which is a segmented stator core on which a coil is wound, may include a first core part 100, a second core part 200, and a third core part 300 that are stacked in an axial direction. In more detail, the first core part 100 may include a first core including a first slot 110, which is a hole into which a coil is inserted. In addition, the second core part 200 includes a second slot 210, which is a hole into which a coil is inserted, and may include a 2-1 core and a 2-2 core arranged so that one surface thereof is in contact with both sides of the first core part 100. The 2-1 core and the 2-2 core may be provided in plurality, and the number of the 2-1 cores and the number of the 2-2 cores may be the same. In addition, the 2-1 core and the 2-2 core may be formed to have the same shape.

In addition, the segmented stator core 1000 of the present disclosure may include a third slot 310, which is a hole into which a coil is inserted. In addition, the segmented stator core 1000 of the present disclosure may include a 3-1 core and a 3-2 core arranged so that one surface thereof is in contact with the other surface of each of the 2-1 and 2-2 cores. The 3-1 core and the 3-2 core may be provided in plurality, and the number of 3-1 cores and the number of 3-2 cores may be the same. In addition, the 3-1 core and the 3-2 core may be formed to have the same shape.

In addition, the second core part 200 preferably includes a cooling flow path 220 formed to receive cooling fluid from the outside and deliver the cooling fluid to the inside of the second slot 210. By allowing the cooling fluid to flow directly into the second slot 210 where the coil is inserted, a portion of the coil interpolated inside the stator core may also be cooled, and cooling efficiency may be increased by allowing the cooling fluid to come into direct contact with the coil.

Hereinafter, detailed features of the first core part 100, the second core part 200, and the third core part 300 of the present disclosure will be described in more detail with reference to FIGS. 2 to 7.

Figure 2:
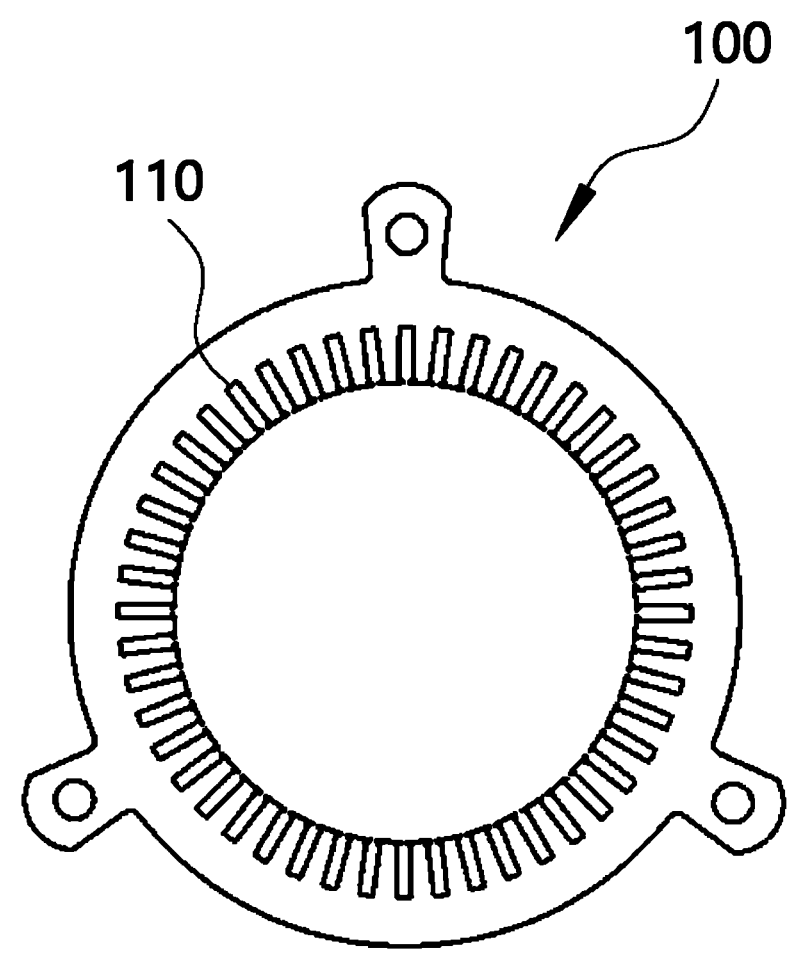
FIG. 2 is a plan view of a first core part of the present disclosure.

As shown in FIG. 2, the first core part 100 may be formed in the shape of a thin plate with an opening center. At this time, the first core part 100 may include a single component, that is, only one first core, or may have a form in which multiple first cores are stacked in the axial direction (a thickness direction of the plate). An overall thickness of the first core part 100 may be thicker than the minimum thickness of a flow path through which the cooling fluid may flow smoothly, considering the physical properties of the cooling fluid. In addition, the first slot 110 may be formed such that one side thereof is open to the opening, and may be formed in a uniform shape and spaced equally apart from each other in a circumferential direction.

Figure 3:
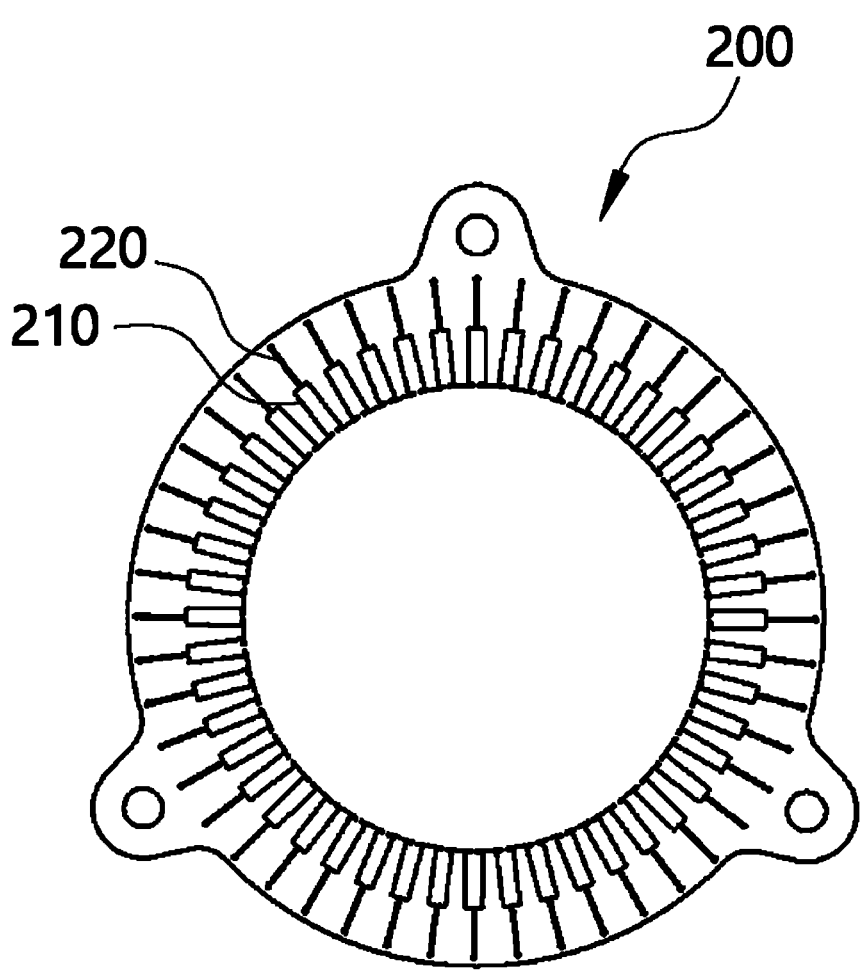
FIG. 3 is a plan view of a second core part of the present disclosure.

In addition, as shown in FIG. 3, the second core part 200, that is, the 2-1 core and the 2-2 core, may be formed in the shape of a thin plate with an opening center. The second slot 210 may be formed such that one side thereof is open to the opening and may be formed in a uniform shape and spaced equally apart from each other in the circumferential direction. In addition, the second slot 210 of the second core part 200 may include a cooling flow path 220 to transmit cooling fluid from the outside to the coil wound inside the second slot 210.

Figure 4:
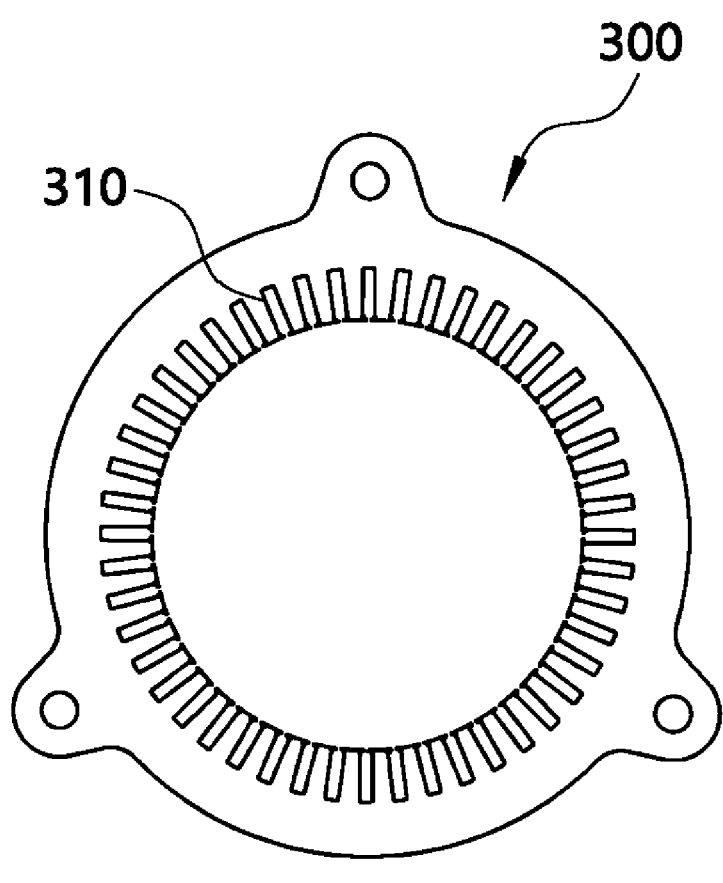
FIG. 4 is a plan view of a third core part of the present disclosure.

In addition, as shown in FIG. 4, the third core part 223, that is, the 3-1 core and the 3-2 core, may be formed in a cylindrical shape with an opening center. FIG. 4 shows the bottom of the third core part 223. A thickness of the third core part 223 may be greater than the overall thickness of the first core part 100 and the thickness of the second core part 200. In addition, the third slot 310 may be formed such that one side thereof is open to the opening and may be formed in a uniform shape and spaced equally apart from each other in the circumferential direction.

At this time, the first core part 100, the second core part 200, and the third core part 223 may extend outwardly in a radial direction and may include a bracket with a screw hole formed in the axial direction at the same position. Accordingly, after the first core part 100, the second core part 200, and the third core part 223 are stacked in the axial direction, their positions may be fixed to each other using fasteners, etc.

Figure 5:
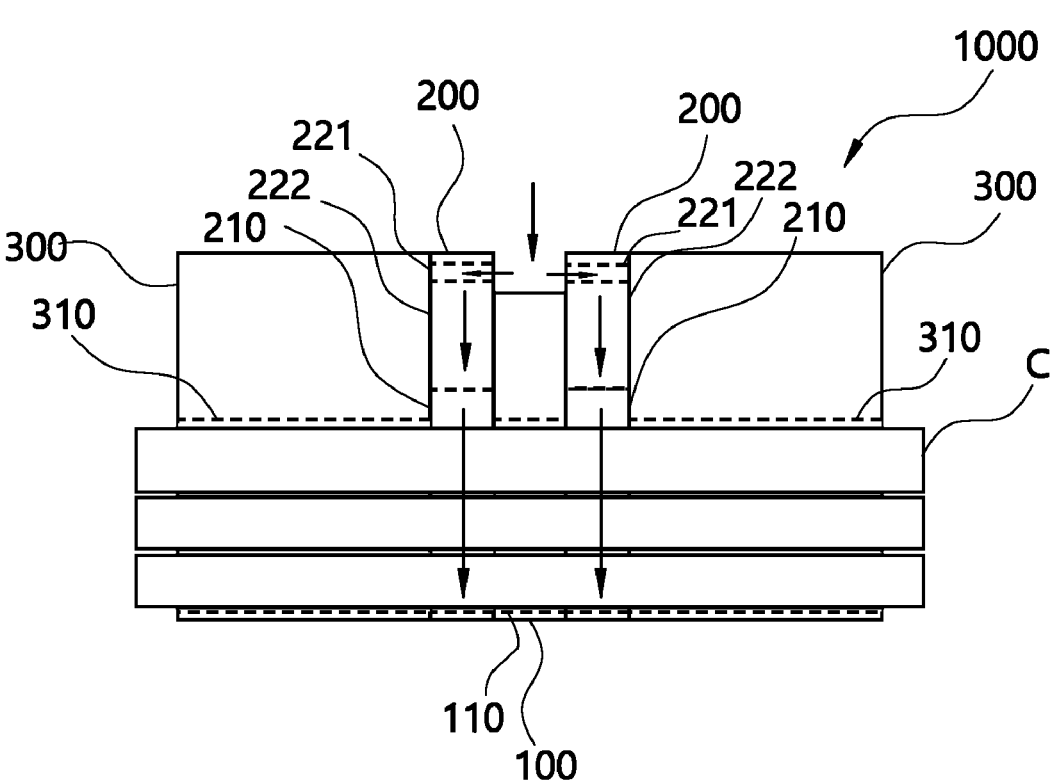
FIG. 5 is an axial cross-sectional view of a segmented stator core of the present disclosure.

In addition, as shown in FIG. 5, an outer diameter of the first core part 100 may be smaller than the outer diameters of the second core part 200 and the third core part 223.

However, it is preferable that outer diameter lengths of the second core part 200 and the third core part 223 are the same. Accordingly, the second core part 200 may include an outer region that is not in contact with the first core part 100, and the cooling flow path 220 formed in the second core part 200 may include a cooling fluid inlet 221 formed in the outer region described above. At this time, the cooling fluid inlet 221 may be formed through the second core part 200.

In addition, when stacking the first core part 100, the second core part 200, and the third core part 223 in the axial direction, the first core part 100 is preferably located in a position corresponding to the cooling fluid inlet 221 formed in an external housing surrounding the segmented stator core 1000.

Through these structural features, in the segmented stator core 1000 of the present disclosure, when the cooling fluid is injected into the position at which the first core part 100 is stacked, the cooling fluid may gather in a region surrounded by the outer region of the first core part 100 and the second core part 200 and the gathered cooling fluid may naturally flow into the cooling fluid inlet 221 formed in the second core part 200. Accordingly, even if the cooling fluid is sprayed on the side of the segmented stator core 1000 of the present disclosure, there is an effect that the cooling fluid may directly exchange heat with the coil interpolated inside the segmented stator core 1000.

Figure 6:
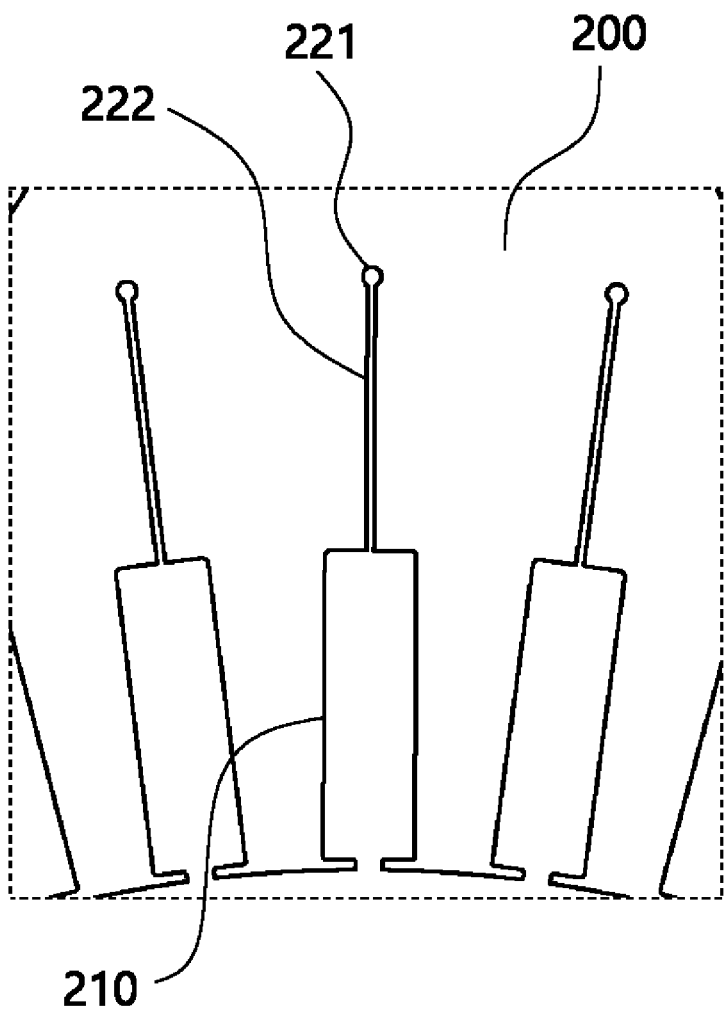
FIG. 6 is a partial plan view of a second core part of the present disclosure.

Also, as shown in FIG. 6, the cooling flow path 220 formed in the second core part 200 may include the cooling fluid inlet 221 and may also include a cooling fluid delivery portion 222 having one end and the other end connected to the cooling fluid inlet 221 and the second slot 210. The cooling fluid delivery portion 222 may be formed through the second core part 200, and thus, a region surrounded by the cooling fluid delivery portion 222, the first core part 100, and the third core part 223 may function as a flow path.

Figure 7:
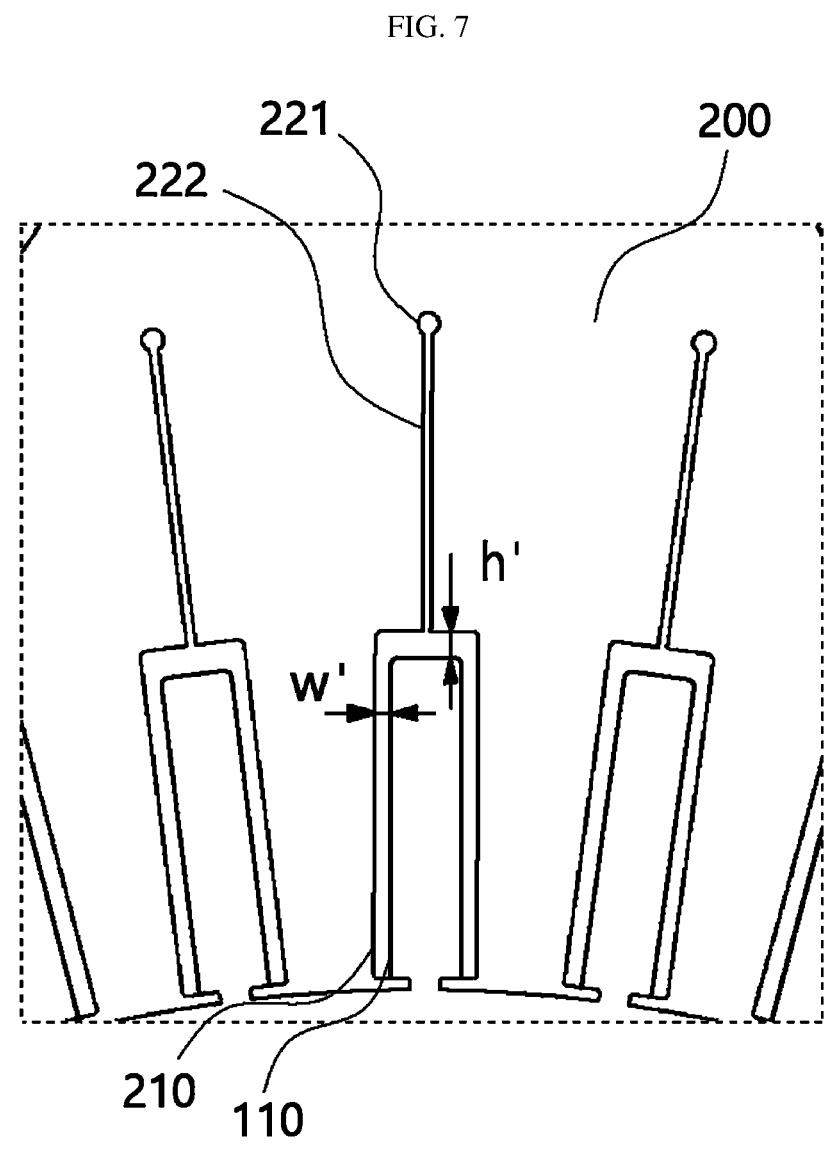

In addition, as shown in FIG. 7, the second slot 210 may be larger than the first slot 110 and the third slot 310 by a predetermined length in width and height. At this time, the second slot 210 and the third slot 310 may be formed to have the same shape. In addition, the first slot 110, the second slot 210, and the third slot 310 may be arranged so that their circumferential centers coincide with each other. That is, the first slot 110 may be formed in the same shape and at a corresponding position, and the second slot 210 may have the same gap on both sides in the circumferential direction compared to the first slot 110 and the third slot 310.

Accordingly, the outside of the second slot 210 may be blocked by the surfaces of the first core part 100 and the third core part 223, and a flow path surrounded by the second slot 210, the coil, the first core part 100, and the third core part 223. Accordingly, the cooling fluid delivered from the cooling fluid delivery flow path may flow along the flow path formed on the outside of the second slot 210 and directly contact the coil, thereby cooling the coil more efficiently.

When a height difference (a length difference in the radial direction) between the second slot 210, the first slot 110, and the third slot 310 is h' and a width difference (a length difference in the circumferential direction) between the second slot 210, the first slot 110, and the third slot 310 is w', the lengths of h' and w' may be greater than the minimum flow path thickness allowing the cooling fluid to smoothly flow in consideration of the thickness of the second core part 200 and the physical properties of the cooling fluid.

Hereinafter, the insulating portion 600 of the present disclosure will be described in more detail with reference to FIG. 8.

Figure 8:
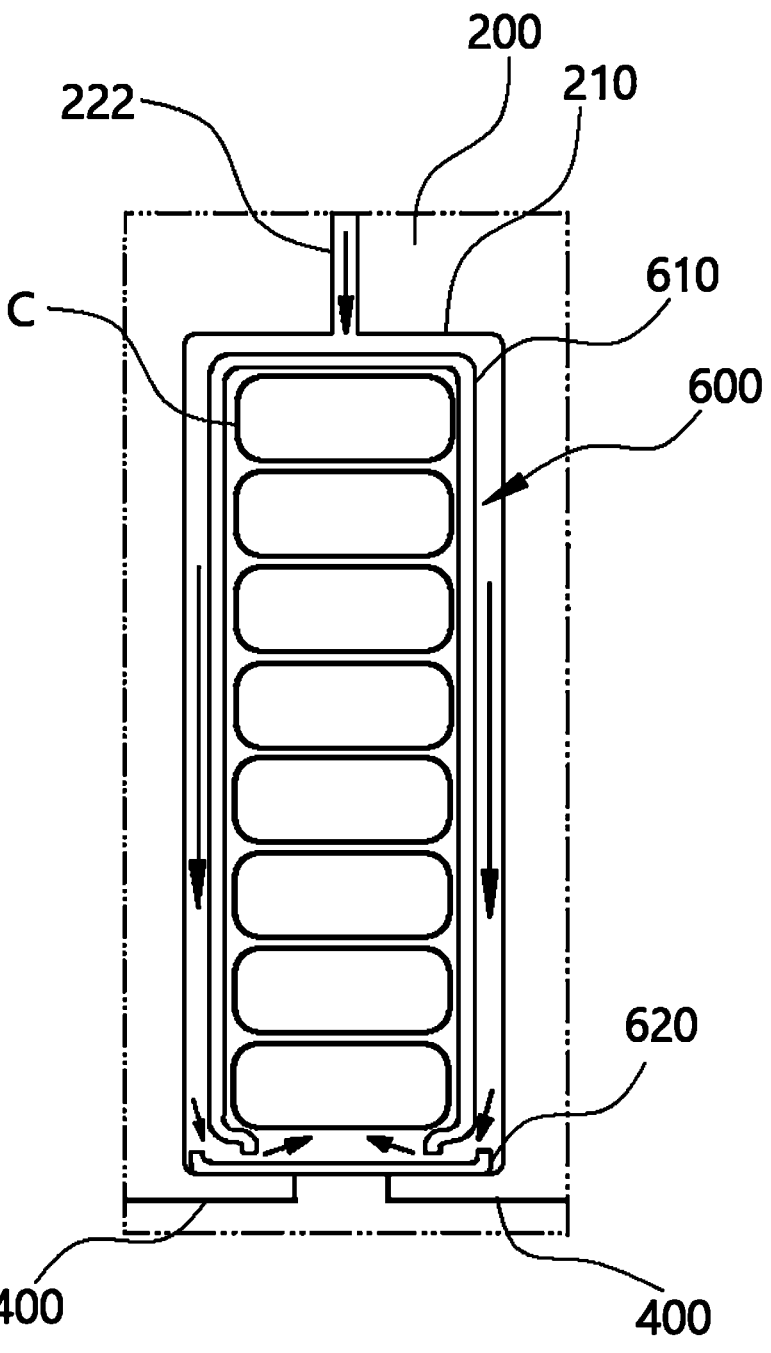
FIG. 8 is a partial cross-sectional view of an embodiment in which an insulating portion of a segmented stator core of the present disclosure is applied.

As shown in FIG. 8, the segmented stator core 1000 of the present disclosure may further include an insulating portion 600 that insulates the coil from the first core part 100, the second core part 200, and the third core part 223, and the insulating portion 600 may include a first insulating paper 610 surrounding an outer surface of the coil and a second insulating paper 620 having one surface in contact with an inner surface of a stator shoe 400, the first slot 110, the second slot 210, and the third slot 310.

Accordingly, as described above, in the insulating portion 600, in addition to simple insulating performance, the cooling fluid flowing into the second slot 210 may be prevented from flowing out of the slot due to the second insulating paper 620 and may flow into the inside of the first insulating paper 610, thereby achieving an effect of directly cooling the coil.

Hereinafter, an embodiment of the cooling flow path 220 of the second core part 200 of the present disclosure will be described with reference to FIGS. 9 and 10.

Figure 9:
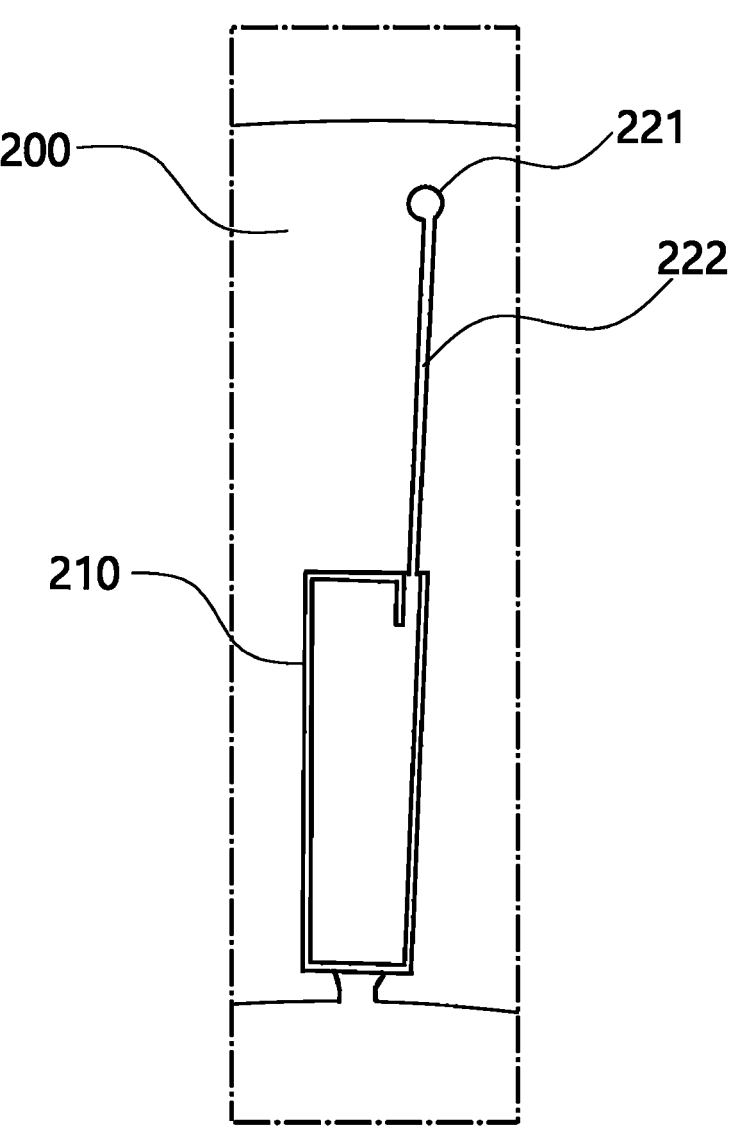
FIG. 9 is a partial plan view of a second core part illustrating a first embodiment of a cooling fluid delivery portion of the present disclosure.

As shown in FIG. 9, the cooling fluid delivery portion 222 may include a first delivery portion communicating with one side of the second slot 210 in the circumferential direction. Accordingly, the cooling fluid may directly flow into the gap between the second slot 210 and the first slot 110/third slot 310, that is, into the flow path including the second slot 210 and the first core part 100, and the fluid may flow into the coil more quickly.

Figure 10:
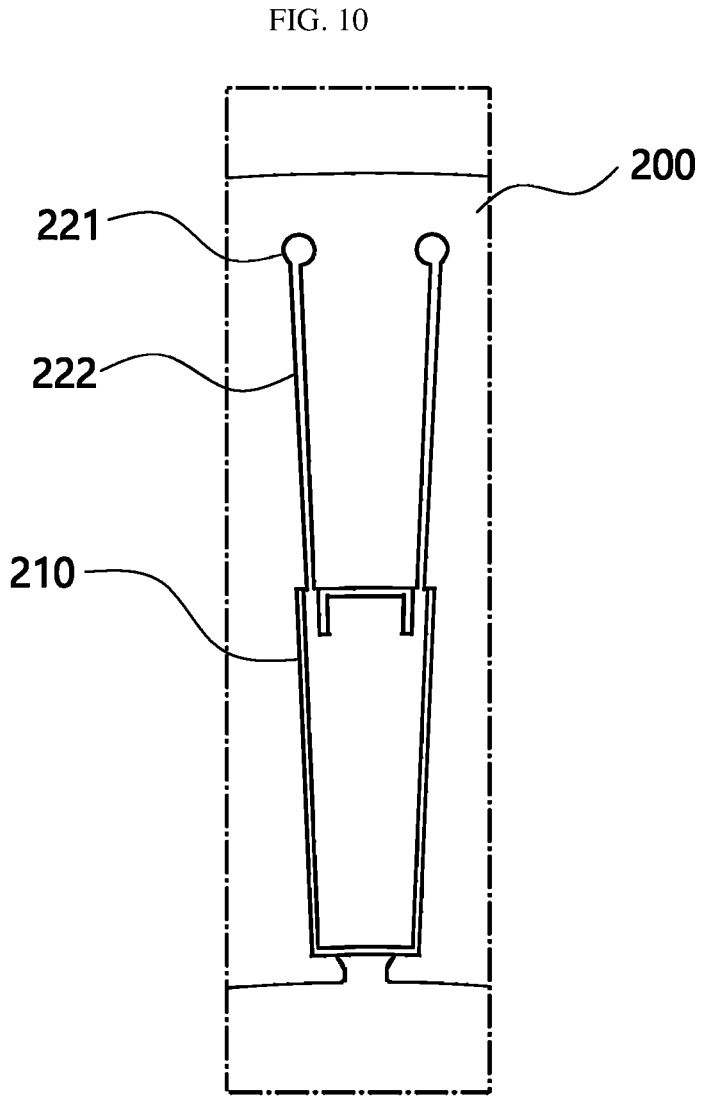
FIG. 10 is a partial plan view of a second core part illustrating a second embodiment of a cooling fluid delivery portion of the present disclosure.

In addition, as shown in FIG. 10, the cooling fluid delivery portion 222 not only includes the first delivery portion described above but may further include a second delivery portion communicating with the other side of the second slot 210 in the circumferential direction. At this time, two cooling fluid inlets 221 may also be formed to correspond to the first and second delivery portions, respectively. Accordingly, cooling fluid may flow into both sides of the gap between the second slot 210 and the first slot 110/third slot 310, and since the fluid may flow into the coil side more quickly, cooling efficiency may be maximized.

At this time, in the embodiment of the cooling flow path 220 shown in FIGS. 9 to 10, the first slot 110, the second slot 210, and the third slot 310 may have a circumferential length of the end portion opposite to the opening greater than a circumferential length of the end portion adjacent to the opening. That is, the first slot 110, the second slot 210, and the third slot 310 may be formed in a trapezoidal shape. Accordingly, when the cooling fluid flowing in through the cooling fluid delivery portion 222 moves toward the opening, pressure may be added, thereby leading the cooling fluid to smoothly penetrate into the inside of the first insulating paper 610 described above.

Figure 11:
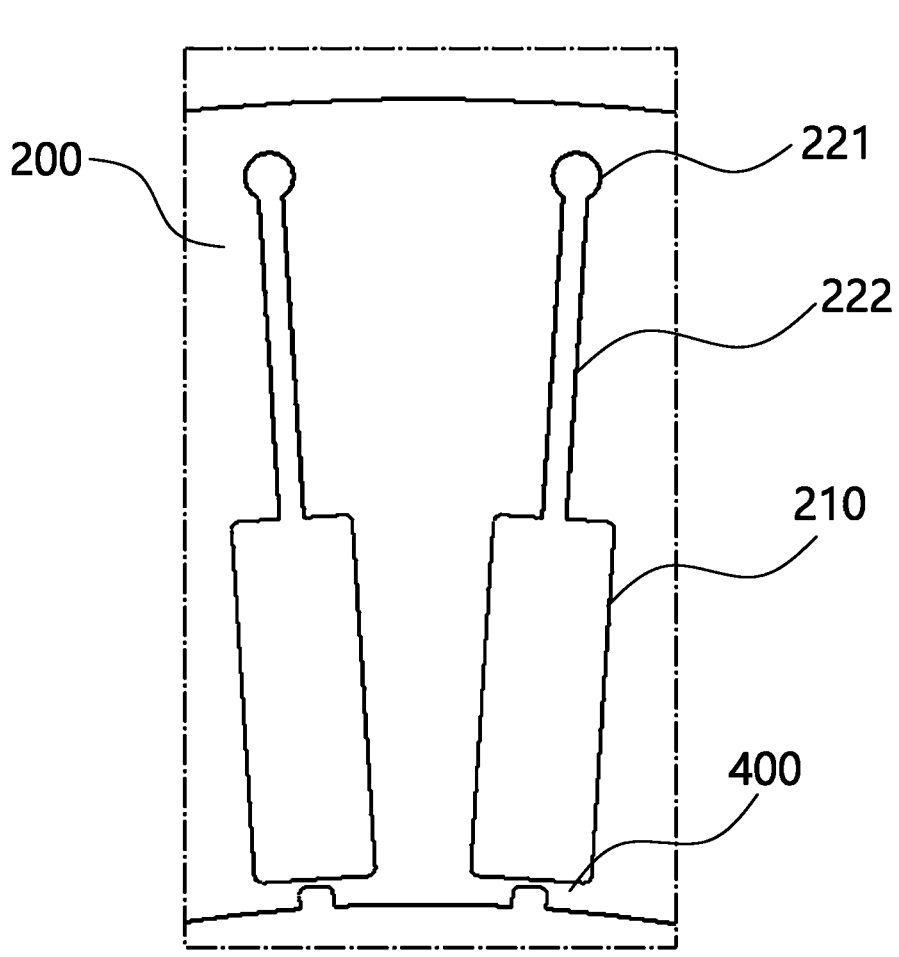
FIG. 11 is a partial plan view of a second core part illustrating a first embodiment of a stator shoe of the present disclosure.

Hereinafter, the stator shoe 400 of the segmented stator core 1000 of the present disclosure and embodiments thereof will be described in more detail with reference to FIGS. 11 to 13.

As described above, the first slot 110, the second slot 210, and the third slot 310 may be formed so that one end thereof is open toward the opening formed at each of the first core part 100, the second core part 200, and the third core part 223. At this time, the first core part 100, the second core part 200, and the third core part 223 may include the stator shoe 400 protruding in the circumferential direction to the inside of the first slot 110, the second slot 210, and the third slot 310 from one end of the first slot 110, the second slot 210, and the third slot 310. In an embodiment, the stator shoe 400 of the second core part 200 may be formed to extend in the circumferential direction to entirely block the second slot 210 and the opening. Accordingly, the stator shoe 400 may support the pressure of the cooling fluid flowing into the second slot 210 and prevent the cooling fluid flowing into the second slot 210 from leaking out.

At this time, the stator shoe 400 of the second core part 200 may have a groove formed in the radial direction at the circumferential center. More specifically, as shown in FIG. 11, in the first embodiment of the stator shoe 400, a groove may be formed on one surface of the stator shoe 400, and one surface of the stator shoe 400 may be a surface opposite to the second slot 210. Accordingly, the stator shoe 400 may support the pressure of the cooling fluid flowing into the second slot 210.

Figure 12:
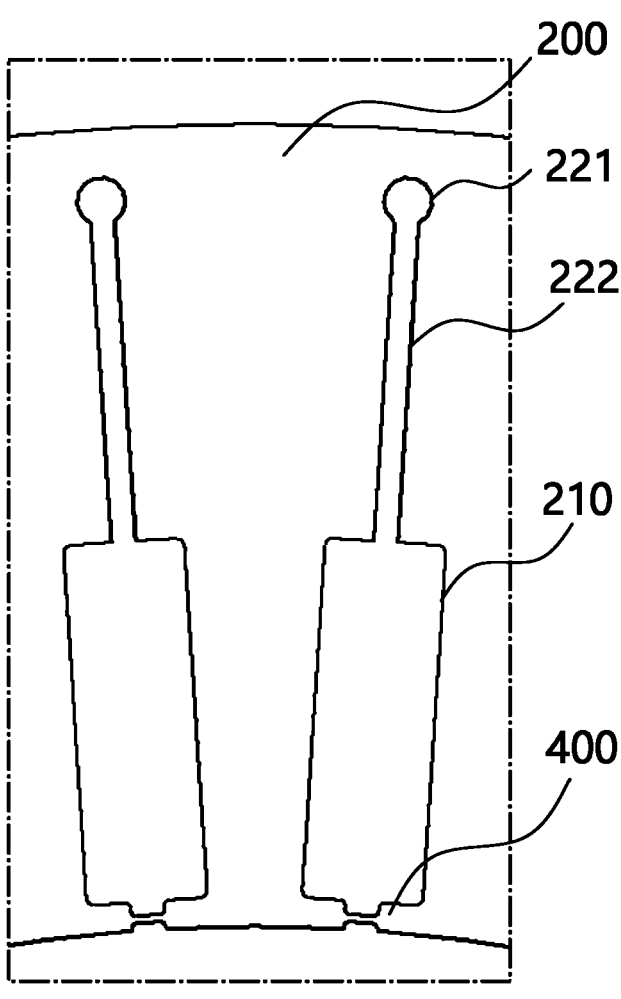
FIG. 12 is a partial plan view of a second core part illustrating a second embodiment of a stator shoe of the present disclosure.

Alternatively, as shown in FIG. 12, in a second embodiment of the stator shoe 400, grooves may be formed on both sides of the stator shoe 400. That is, grooves may be formed on a surface of the stator shoe 400 facing the second slot 210 and an opposite surface thereof. Accordingly, the stator shoe 400 may support the pressure of the cooling fluid flowing into the second slot 210, and furthermore, when hydraulic pressure of the cooling fluid flowing into the second slot 210 exceeds a certain level, a portion of the cooling fluid may flow into the groove located on the surface facing the second slot 210 of the stator shoe 400 and a portion of the cooling fluid may flow out in the axial direction, thereby slightly adjusting the hydraulic pressure inside the second slot 210.

Figure 13:
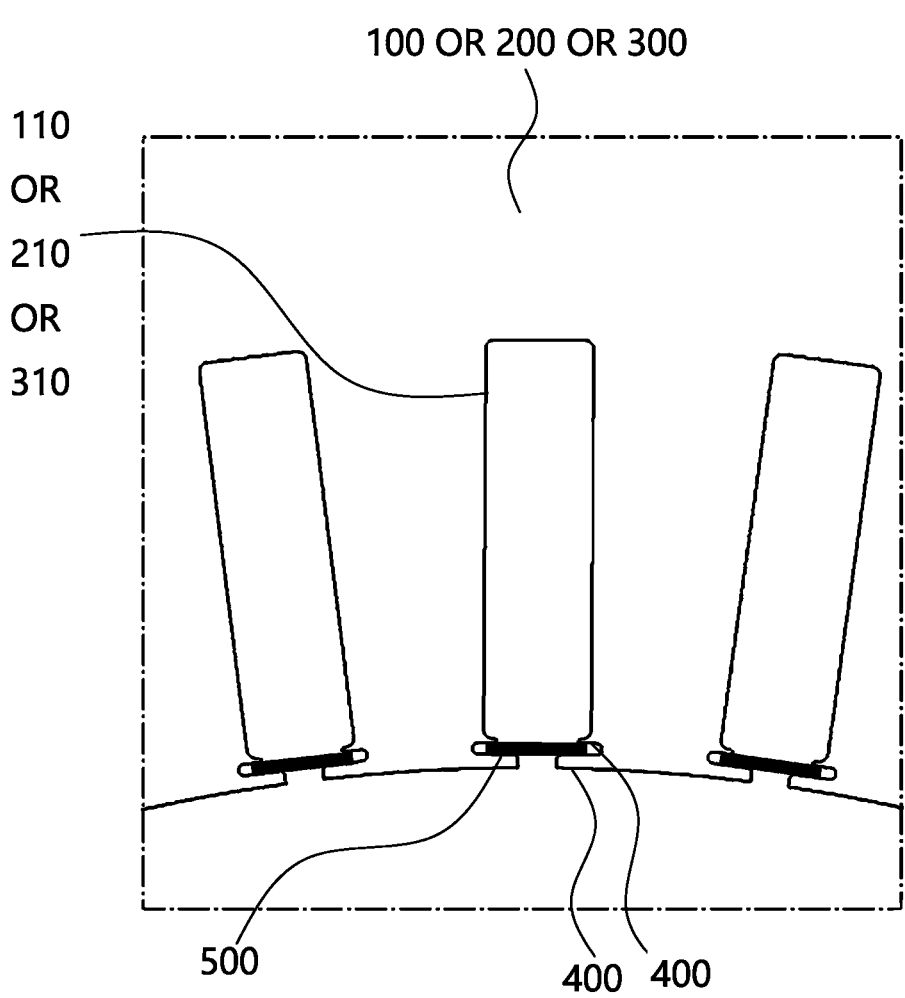
FIG. 13 is a partial plan view illustrating a third embodiment of a stator shoe of the present disclosure.

In addition, as shown in FIG. 13, in a third embodiment of the stator shoe 400, the stator shoe 400 may be formed in two or more pieces in the radial direction and extend longer in the circumferential direction toward the opening. At this time, it is preferable that the segmented stator core 1000 of the present disclosure further includes a support 500 inserted between the stator shoes 400. The support 500 may be formed of an insulating material. By including the support 500 coupled to the stator shoe 400, stability may be increased by preventing vibration of the stator shoe 400 when a motor is driven, and in the case of the second slot 210, the support 500 may support the pressure of the cooling fluid flowing into the second slot 210. In addition, by including the support 500, the cooling fluid flowing into the second slot 210 may be prevented from leaking out.

In the segmented stator core of the present disclosure having the above configuration, the coil inside the slot, which has a higher temperature than the end coil, is cooled, thereby reducing the risk of damage to the insulating portion.

In addition, since both the end coil and the slot internal coil may be cooled, a load is small even if a high current is applied, thereby increasing the power of the same motor size or reducing the motor size based on the same power.

In addition, because cooling may be performed without separate components, such as a cooling pipe that sprays cooling oil onto the coil, material cost may be reduced and part of a manufacturing process may be eliminated.

The present disclosure should not be construed to being limited to the above-mentioned exemplary embodiment. The present disclosure may be applied to various fields and may be variously modified by those skilled in the art without departing from the scope of the present disclosure claimed in the claims. Therefore, it is obvious to those skilled in the art that these alterations and modifications fall in the scope of the present disclosure.

DETAILED DESCRIPTION OF MAIN ELEMENTS

1000: segmented stator core
100: first core part

110: first slot
200: second core part
210: second slot
220: cooling flow path
221: cooling fluid inlet
222: cooling fluid delivery portion
300: third core part
310: third slot
400: stator shoe
500: support
600: insulating portion
610: first insulating paper
620: second insulating paper

What is claimed is:

1. A segmented stator core around which a coil is wound, the segmented stator core comprising:
   a first core part including a first core including a first slot, which is a hole into which the coil is inserted;
   a second core part including a second slot, which is a hole into which the coil is inserted, and including a 2-1 core and a 2-2 core arranged on both sides of the first core part so that one surface of each of the 2-1 core and the 2-2 core is in contact with a respective side of the first core part; and
   a third core part including a third slot, which is a hole into which the coil is inserted, and including a 3-1 core and a 3-2 core arranged on opposite surfaces of the 2-1 core and the 2-2 core, respectively, so that one surfaces of the 3-1 core and the 3-2 core are in contact with the respective opposite surfaces of the 2-1 core and the 2-2 core,
   wherein the second core part includes a cooling flow path extending to receive cooling fluid from an outside and deliver the cooling fluid to an inside of the second slot.

2. The segmented stator core of claim 1, wherein an outer diameter of the first core part is smaller than an outer diameter of the second core part and an outer diameter of the third core part.

3. The segmented stator core of claim 2, wherein
   the second core part includes an outer region that does not contact the first core part, and
   the cooling flow path extends through the second core part and includes a cooling fluid inlet disposed in the outer region and a cooling fluid delivery portion having one end and another end connected to the cooling fluid inlet and the second slot, respectively.

4. The segmented stator core of claim 3, wherein the cooling fluid delivery portion includes a first delivery portion in communication with one side of the second slot in a circumferential direction.

5. The segmented stator core of claim 4, wherein the cooling fluid delivery portion further includes a second delivery portion in communication with another side of the second slot in the circumferential direction.

6. The segmented stator core of claim 3, wherein the second slot is larger than the first slot and the third slot by a predetermined length in width and height.

7. The segmented stator core of claim 1, wherein
   the first slot, the second slot, and the third slot are configured such that one end thereof is open toward an opening defined in a center of each of the first core part, the second core part, and the third core part, and
   each of the first core part, the second core part, and the third core part includes a stator shoe protruding to an inner side of the first slot, the second slot, and the third slot in a circumferential direction from the one end of the first slot, the second slot, and the third slot.

8. The segmented stator core of claim 7, wherein the first slot, the second slot, and the third slot are configured such that a circumferential length of an end portion of each of the first slot, the second slot, and the third slot opposite to the opening is larger than a circumferential length of an end portion adjacent to the opening.

9. The segmented stator core of claim 7, wherein the stator shoe of the second core part extends in the circumferential direction to completely block the second slot and the opening from each other.

10. The segmented stator core of claim 7, wherein the stator shoe of the second core part has a groove recessed in a radial direction in a circumferential center of the stator shoe.

11. The segmented stator core of claim 7, wherein the stator shoes are formed in two or more pieces in the radial direction, extend longer in the circumferential direction toward the opening, and further include a support inserted between the stator shoes.

12. The segmented stator core of claim 1, further comprising:

an insulating portion insulating the coil from the first core part, the second core part, and the third core part, wherein the insulating portion includes a first insulating paper surrounding an outer surface of the coil and a second insulating paper having one surface in contact with inner surfaces of the stator shoe and the first slot, the second slot, and the third slot.

\* \* \* \* \*